C. W. FILLMORE.
Improvement in Hubs for Vehicles.
No. 130,416. Patented Aug. 13, 1872.
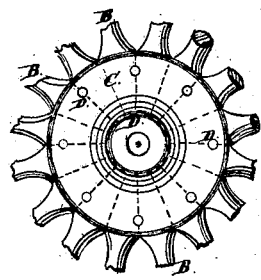
Fig. 2.
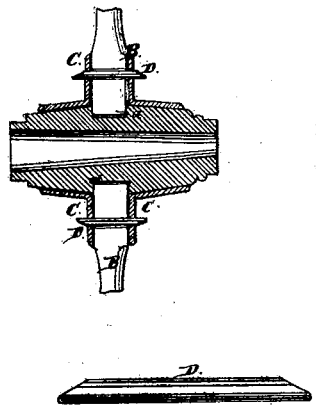
Fig. 1.
Fig. 3.
Witnesses:
Heinrich F. Bruns.
John W. Munday
Inventor:
Charles W. Fillmore

UNITED STATES PATENT OFFICE.

CHARLES W. FILLMORE, OF CHICAGO, ILLINOIS.

IMPROVEMENT IN HUBS FOR VEHICLES.

Specification forming part of Letters Patent No. 130,416, dated August 13, 1872.

Specification describing certain Improvements in Hubs for Vehicles, invented by CHARLES W. FILLMORE, of Chicago, in the county of Cook and State of Illinois.

Nature of the Invention.

This invention relates to that class of hubs in which the spokes, made of a wedge-shape at the ends, are compressed between two clamping-plates, held together by bolts or rivets, or their equivalents; and the invention consists in the method of securing the spokes from withdrawal by means of dowel rivets passing through apertures cut between the spokes, so that one dowel will hold two spokes, and passing through the clamping-plates, being secured by riveting or otherwise against the outside of said plates, the ends of said dowels being cut away to a wedge shape, so that, as the plates are driven home the spokes are drawn toward the center of the hub; the purpose of the invention being to both secure the said spokes and tighten them by drawing them to the center in one operation, whereby a stronger and better wheel is made than heretofore with the same operation, when said dowels are not so made.

In the accompanying drawing, which forms part of this specification, Figure 1 is a front view of a hub constructed according to my invention. Fig. 2 is a vertical central section of the same; and Fig. 3 is a view of one of the wedge-dowels detached, and upon a comparatively larger scale than the preceding figures.

Like letters of reference indicate like parts upon the several figures.

To enable those skilled in the art to make and use my invention, I will proceed to describe the same with particularity, making use, in so doing, of the aforesaid drawing by letters of reference thereto.

General Description.

A is the hub proper, commonly made of wood, and provided with an encircling groove, a, into which the spokes B are inserted. These spokes are made with wedge-shaped ends, so that they lie in contact in the groove and fill the entire space thereof. C C are the clamping-plates slipped over the hub from each end and brought up against the spokes by any usual means. D are the dowels, which, driven through apertures, cut between each pair of spokes, as seen in the drawing, so that half of the aperture will lie within one spoke and half within the next adjacent spoke, and each dowel is thus made to secure two spokes. These dowels are made wedge-shaped, or beveled to a point, rather, at both ends, and are inserted between the spokes, so that the point of the bevel or wedge will stand nearest the center of the hub. Holes are made in the vertical flange of the compression-plates C to correspond in position to the inserted dowels, except the circle taken from the imaginary center of the hub, in which said holes lie in the plates, is somewhat less in diameter than that in which the dowels stand, so that, when the plates are placed over the dowels, only the points of the bevels will enter the holes, and the incline of the said beveled points will engage the edge of the holes furthest from the center of the hub. Now, as the plates are driven home from both sides simultaneously they will approach the spokes upon the bevels of the dowels, as upon a cone from apex to base, and, as a consequence, the dowels draw toward the center of the hub carrying thereto the spokes, and setting them firmly in the groove, thus both securing and tightening them. The plates C C are fastened in any of the known methods, and the ends of the dowels projecting beyond the face of the plates are cut off and riveted down, thus assisting to connect said plates together.

Claims.

Having thus fully described the construction and operation of my invention, what I claim as new, and desire to secure by Letters Patent, is—

1. The dowels D made with a bevel at both ends, substantially as and for the purpose specified.
2. The combination of the dowels D, having beveled ends, the spokes B, and the compression-plates C C, constructed and operating substantially as and for the purpose specified.

CHARLES W. FILLMORE.

Witnesses:
HEINRICH F. BRUNS,
JOHN W. MUNDAY.